(12) United States Patent
Jarczynski et al.

(10) Patent No.: US 7,816,825 B2
(45) Date of Patent: Oct. 19, 2010

(54) HEAT TRANSFER ENHANCEMENT OF VENTILATION CHIMNEYS FOR DYNAMOELECTRIC MACHINE ROTORS

(75) Inventors: Emil D. Jarczynski, Scotia, NY (US); Norman J. Suguitan, Ballston Lake, NY (US); William D. Gerstler, Niskayuna, NY (US); Christopher Anthony Kaminski, Schenectady, NY (US); Hendrik P. J. de Bock, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 133 days.

(21) Appl. No.: 12/178,208

(22) Filed: Jul. 23, 2008

(65) Prior Publication Data

US 2010/0019591 A1 Jan. 28, 2010

(51) Int. Cl.
*H02K 9/00* (2006.01)
*H02K 9/06* (2006.01)
*H02K 1/32* (2006.01)

(52) U.S. Cl. .................. 310/59; 310/58; 310/55; 310/61; 310/64

(58) Field of Classification Search .......... 310/58–59, 310/61, 64, 55
See application file for complete search history.

(56) References Cited

U.S. PATENT DOCUMENTS

| | | | |
|---|---|---|---|
| 2,778,959 A | 1/1957 | Kilner | |
| 3,995,180 A * | 11/1976 | Giles | 310/55 |
| 4,543,503 A | 9/1985 | Kaminski et al. | |
| 4,709,177 A | 11/1987 | Kaminski | |
| 5,281,877 A | 1/1994 | Kazmierczak et al. | |
| 5,644,179 A | 7/1997 | Staub et al. | |
| 5,685,063 A | 11/1997 | Prole et al. | |
| 6,204,580 B1 | 3/2001 | Kazmierczak | |
| 6,362,545 B1 * | 3/2002 | Prole et al. | 310/58 |
| 6,459,180 B1 | 10/2002 | Mori | |
| 6,628,020 B1 | 9/2003 | Tong | |

FOREIGN PATENT DOCUMENTS

| | | |
|---|---|---|
| DE | 3700508 A1 | 7/1988 |
| GB | 936617 | 9/1963 |
| JP | 10285853 A | 10/1998 |
| SU | 1615842 A * | 12/1990 |

OTHER PUBLICATIONS

Derwent Translation Abstract and Use/Advantage (SU1615842A).*

(Continued)

*Primary Examiner*—Quyen Leung
*Assistant Examiner*—Jose A Gonzalez Quinones
(74) *Attorney, Agent, or Firm*—James W. Pemrick; Ernest G. Cusick; Frank A. Landgraff

(57) ABSTRACT

A cooling gas ventilation chimney is provided for enhancing the heat transfer of an end region of a dynamoelectric machine. The dynamoelectric machine includes a rotor having a plurality of radial slots. A plurality of coils are seated in the radial slots, and the coils form a plurality of radially stacked turns. The ventilation chimney includes one or more chimney slots defined in at least a portion of the radially stacked turns. The chimney slots extend in a substantially radial direction to the rotor, and some of the chimney slots have an axial or circumferential length different from other chimney slots.

16 Claims, 7 Drawing Sheets

OTHER PUBLICATIONS

M. K. Chyu, et al., "Concavity Enhanced Heat Transfer in an Internal Cooling Passage", ASME Proceedings of the 1997 International Gas Turbine & Aeroengine Congress & Exhibition, Paper No. 437, p. 1-7, Orlando, FL, Jun. 2-5, 1997.

* cited by examiner

HEAT TRANSFER ENHANCEMENT OF VENTILATION CHIMNEYS FOR DYNAMOELECTRIC MACHINE ROTORS

This application is related to application Ser. No. 12/132, 172, to Rebecca A. Nold et al., titled "Heat Transfer Enhancement Of Ventilation Chimneys For Dynamoelectric Machine Rotors", and filed on Jun. 3, 2008.

BACKGROUND OF THE INVENTION

The present invention relates to increasing heat transfer performance of a ventilation chimney in the rotor of a dynamoelectric machine. Specifically, the invention relates to turbulating the surface of a ventilation chimney in a rotor to increase the heat transfer performance.

The rotors in large gas cooled dynamoelectric machines have a rotor body which is typically made from a machined high-strength solid iron forging. Axially extending radial slots are machined into the outer periphery of the rotor body at specific circumferential locations to accommodate the rotor winding. The rotor winding in this type of machine typically consists of a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges that bear against machined dovetail surfaces in each slot. The regions of the rotor winding coils that extend beyond the ends of the main rotor body are called "end windings" and are supported against centrifugal forces by high strength steel retaining rings. The section of the rotor shaft forging which is disposed underneath the rotor end windings is referred to as the spindle. For ease of reference and explanation hereinbelow, the rotor winding can be characterized as having a central radial flow or diagonal flow region between the end winding discharge chimneys, a rotor end winding region that extends beyond the pole face, radially spaced from the rotor spindle, and a slot end region which contains the radial flow ventilation or discharge chimneys. The slot end region is located between the central radial flow region and the rotor end winding region.

The design of large turbo-electric or dynamoelectric machinery requires high power density in the stator and rotor windings. As ratings increase, both specific loading of the windings (i.e., current carried by a given cross section) and the distance to a heat sink such as a cooler (or heat exchanger) also increase. Additional cooling technology can be employed to carry heat out of the parts of the generator.

Direct cooling of the rotor windings is a well-established practice in electric machinery design. The cooling medium, typically hydrogen gas or air, is introduced directly to the winding in several ways. The gas may enter the rotor through subslots cut axially into the rotor forging. and exhaust through radial ducts in the copper. The pumping action caused by rotation of the rotor and the heating of the gas pulls gas through the subslot and out the radial ducts. Alternatively, gas may be scooped out of the gap at the rotating surface of the rotor and may follow a diagonal or radial-axial path through the copper winding. The gas exhausts once again at the rotor surface without need for a subslot. These two strategies cool the windings in the rotor body.

Rotor end turns may require additional cooling. One established method for this is to place one or more longitudinal grooves in the copper turn. The groove connects to an outlet at or near the rotor surface that will pull gas through the groove. The outlet can be a radially directed duct at the end of the rotor body, or the grooves can lead to a vent slot in the tooth or pole of the rotor body. In general, the retaining ring that mechanically supports the end turns is not penetrated. The end turn grooving strategy can be used with any type of rotor body cooling, either radial, radial-axial, or gap-pickup. End turn cooling grooves can also exhaust to a radial ventilation or discharge chimney.

To exhaust the end section gases, the discharge or ventilation chimney is located in the outermost axial position of the rotor body, where it receives no additional cooling from the radial or diagonal flow ducts in the center body section. The discharge chimney is typically the hottest section in the rotor, limiting power output since electrical insulation temperature limits should not be exceeded.

Because of the large number of grooves that typically exhaust to the discharge chimney, the chimney flow crosssection is usually larger than a radial duct used to cool the center body section of the rotor, in both the direction of slot width and along the longitudinal direction of the conductors. Since the cooling gas discharging through the chimney has already cooled and removed heat from the end section, the gas entering the chimney is at elevated temperature. The electrical conductor surrounding the chimney generates heat and also needs to be cooled, and this conductor temperature will be high because it is being cooled with gas at elevated temperature. This causes one of the hottest regions of the rotor to be near the location of the discharge chimney, which limits rotor output and electric power performance. At the same time, the large chimney flow area requires removing more electrical conducting area from the winding, causing increased electrical resistance and heating in the same area where the chimney is cooled with gas at elevated temperature. In addition, the discharge chimney will have less heat transfer surface area on its walls compared to the gas flow cross section in a typical radial cooling duct in the body section of the rotor. Furthermore, because of its large size, the discharge chimney is typically machined such as in a milling operation, and this leaves a smooth surface, and the resulting smooth wall further reduces heat transfer performance.

Accordingly, a need exists in the art for a discharge chimney having improved heat transfer characteristics to more effectively cool the end section of the rotor.

BRIEF DESCRIPTION OF THE INVENTION

A cooling gas ventilation chimney is provided for an end region of a dynamoelectric machine. The dynamoelectric machine includes a rotor having a plurality of radial slots. A plurality of coils are seated in the radial slots, and the coils form a plurality of radially stacked turns. The ventilation chimney includes one or more chimney slots defined in at least a portion of the radially stacked turns. The chimney slots extend in a substantially radial direction to the rotor, and some of the chimney slots have an axial or circumferential length different from other chimney slots.

A cooling gas ventilation chimney is provided for an end region of a dynamoelectric machine. The dynamoelectric machine includes a rotor having a plurality of radial slots. A plurality of coils are seated in the radial slots, and the coils form a plurality of radially stacked turns. The ventilation chimney includes one or more chimney slots defined in at least a portion of the radially stacked turns. The chimney slots extend in a substantially radial direction to the rotor, and at least a portion of a surface of one or more chimney slots are turbulated so as to have a roughened surface profile for enhanced heat transfer. At least one bleeder hole is located near the bottom of the chimney for admitting cooling gas from a rotor subslot.

A cooling gas ventilation chimney is provided for an end region of a dynamoelectric machine. The dynamoelectric machine includes a rotor having a plurality of radial slots. A plurality of coils are seated in the radial slots, and the coils form a plurality of radially stacked turns. The ventilation chimney includes one or more chimney slots defined in at least a portion of the radially stacked turns. The chimney slots extend in a substantially radial direction to the rotor. One or more end turn cooling grooves are configured to exhaust into at least a portion of the chimney slots. A heat transfer characteristic of the chimney can be improved by at least one, or combinations of, varying the location where the chimney slots meet the one or more end turn cooling grooves and varying the size, shape or position of the one or more chimney slots.

DETAILED DESCRIPTION OF THE INVENTION

Figure 1:
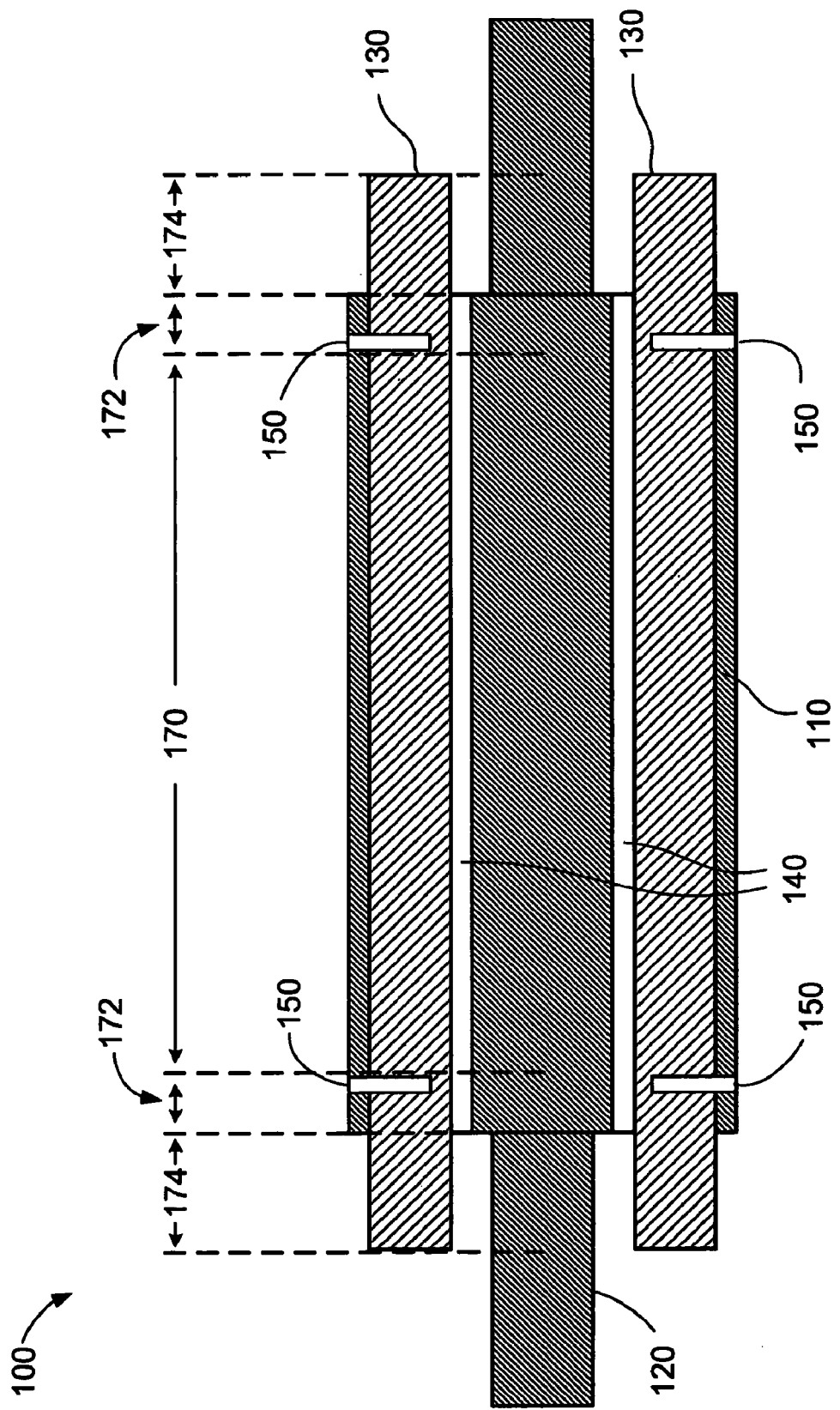
FIG. 1 illustrates a schematic of a rotor of a dynamoelectric machine.

FIG. 1 illustrates a cross-section of a rotor 100 that includes a rotor body 110, rotor spindle 120, winding 130, subslot 140 and ventilation or discharge chimneys 150. Rotor 100 is typically made from a machined high-strength solid iron forging. Axially extending radial slots are machined into the outer periphery of the rotor body 110 at specific circumferential locations to accommodate the rotor winding 130. The rotor winding 130 typically comprises a number of complete coils, each having many field turns of copper conductors. The coils are seated in the radial slots in a concentric pattern with, for example, two such concentric patterns in a two-pole rotor. The coils are supported in the rotor body slots against centrifugal forces by wedges that bear against machined dovetail surfaces in each slot. The regions of the rotor winding coils that extend beyond the ends of the main rotor body are called "end windings" and are supported against centrifugal forces by high strength steel retaining rings. The end winding section is illustrated by region 174. The section of the rotor shaft forging which is disposed underneath the rotor end windings is referred to as the spindle 120. For ease of reference and explanation herein-below, the rotor winding can be characterized as having a central radial flow region or body cooling region 170. The end winding region 174 extends beyond the pole face, and is radially spaced from the rotor spindle. The slot end region 172 contains the discharge chimneys 150, and is located between the body cooling region 170 and the end winding region 174. In some embodiments, the rotor end region can include the slot end region 172 and/or the end winding region 174.

Figure 2:
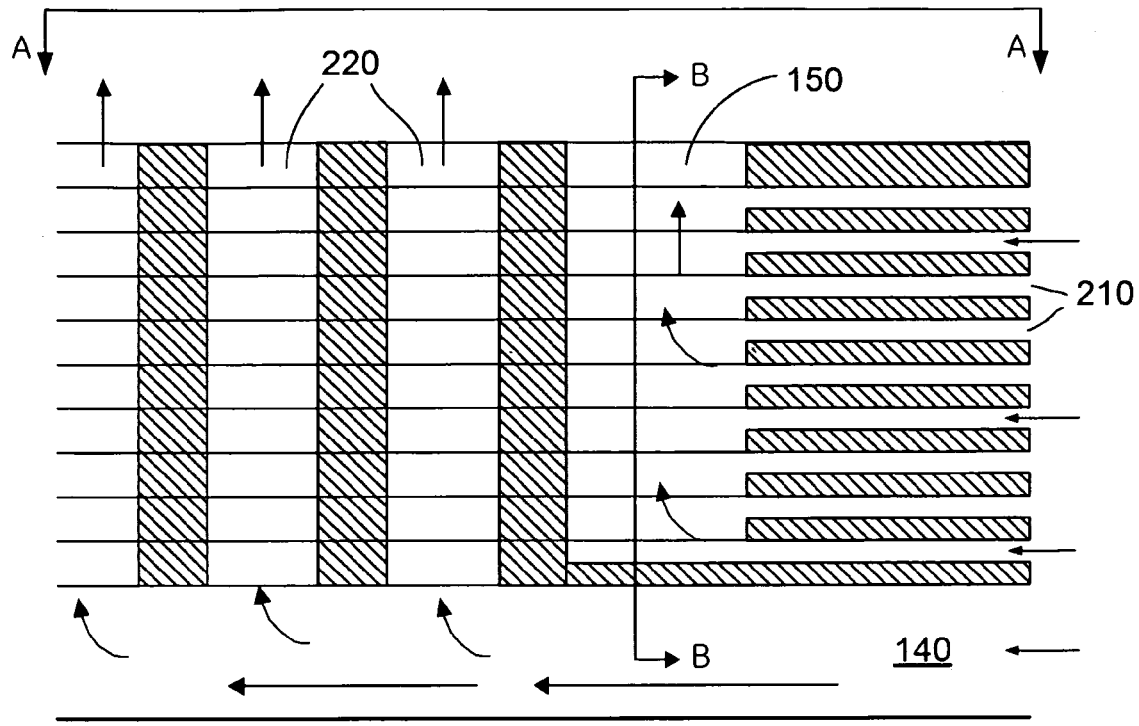
FIG. 2 illustrates a sectional view of a ventilation chimney that is located between the end winding region and the central radial flow region of the rotor of FIG. 1.

FIG. 2 shows one known system for exhausting end turn cooling grooves in the rotor of a dynamoelectric machine. The end turn cooling grooves 210 enter from the right and exhaust to the chimney 150. Cooling gas flows (as indicated by the arrows in FIG. 2) in a generally horizontal or axial direction in cooling grooves 210, and flows in a generally vertical or radial direction in ventilation chimney 150. The holes in each turn (or conductor layer) that comprise the chimney 150 can be referred to as chimney slots. Accordingly, the chimney 150 is comprised of one or more chimney slots. Additional radially oriented ducts 220 may also be located to vent gas from subslot 140. Rotor end turns may also exhaust to two chimneys, with the upper fraction of the grooves 210 connecting to a first chimney, and the lower grooves connecting to a second chimney. The radial cross-sectional area of chimney 150 is constant in this known system.

Figure 3:
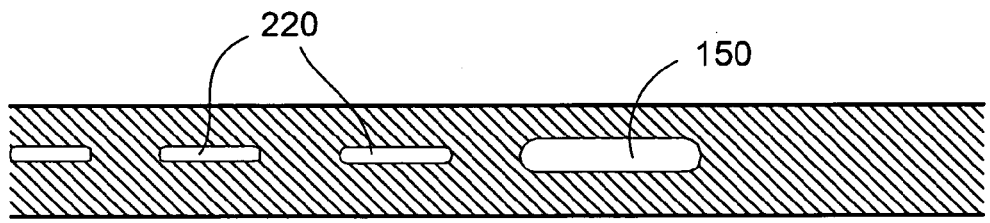
FIG. 3 illustrates a top-down view, along section line A-A of FIG. 2, and shows the relative size of the ventilation chimney compared to the radial ducts.
Figure 4:
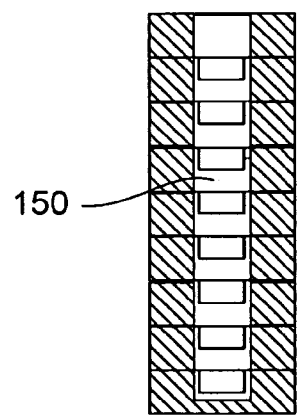
FIG. 4 illustrates a cross section of the termination of the end turn cooling grooves in the ventilation chimney, as seen from section line B-B of FIG. 2

FIG. 3 illustrates a top view along section line A-A of FIG. 2, and shows the relative size of the chimney 150 compared to the radial ducts 220. The radial cross-sectional area of chimney 150 is larger than the cross-sectional area of ducts 220. FIG. 4 illustrates a view toward the end turn grooves as seen looking through section line B-B of FIG. 2, and shows a cross section of the termination of the end turn cooling grooves 210 in chimney 150. It can be seen that the interior walls of chimney 150 are smooth.

Figure 5:
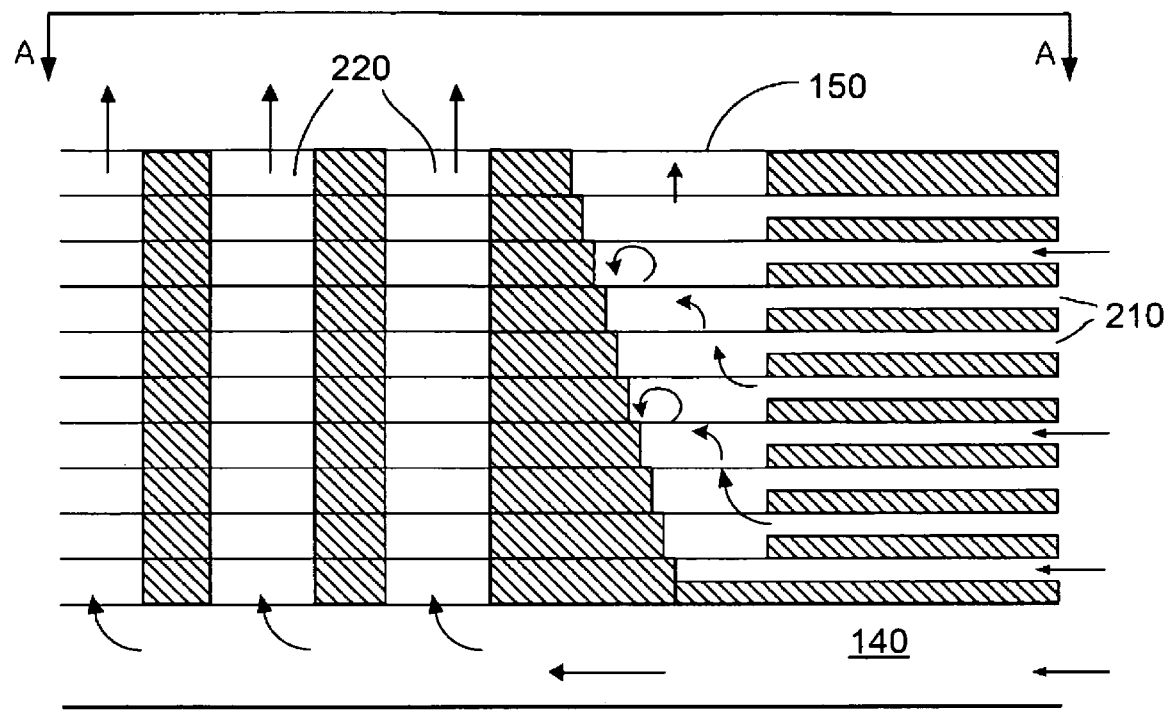
FIG. 5 illustrates a sectional view of a turbulated ventilation chimney according to one embodiment of the present invention.

FIG. 5 illustrates one embodiment of the present invention that improves the heat transfer performance of the ventilation chimney 150. Analysis with computational fluid dynamics (CFD) has shown that in chimneys having a constant radial cross-sectional area (as shown in FIG. 2) the cooling gas flowing through chimney 150 may be relatively stagnant at the radially inner part of the chimney. This effect is even more pronounced when only a few end turns have exhausted into the chimney 150.

The heat transfer performance of the chimney can be improved by configuring the chimney to have a graduated size by varying the duct or slot length in some or all of the conductor layers. This approach can minimize or eliminate flow stagnation and keep the gas working throughout the course of radial travel. The arrows in chimney 150 illustrate one example of cooling gas flow. The duct or slot length could be short at the bottom of the chimney and gradually increase towards the radially outward portion of the coil. One advantage to this approach is the preservation of copper area and increased electrical conductivity in the lower turns. Other embodiments could incorporate one or more ducts or chimney slots having the same or different lengths, and the slot length could increase, decrease or remain the same in various radial positions of chimney 150, or the degree of tilt of the edge of the slot could be varied, depending upon the degree of turbulation desired.

Figure 6:
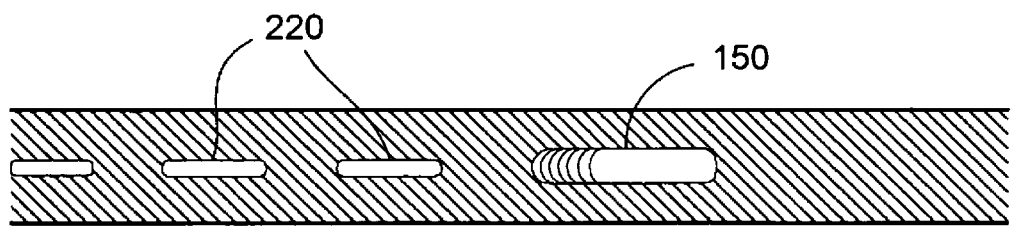
FIG. 6 illustrates a top-down view, along section line A-A of FIG. 5, and shows the relative size of the ventilation chimney compared to the radial ducts.

FIG. 6 illustrates a top view along section line A-A of FIG. 5, and shows the relative size of the chimney 150 compared to the radial ducts 220. It can be seen that the interior walls of chimney 150 have chimney slots of graduated size that increase the heat transfer area and turbulate the flow of the cooling gas. The strategy depicted by FIGS. 5 and 6 and described above can be combined with other heat transfer augmentation strategies that roughen and/or offset the chimney slots to increase turbulence and heat transfer.

Figure 7:
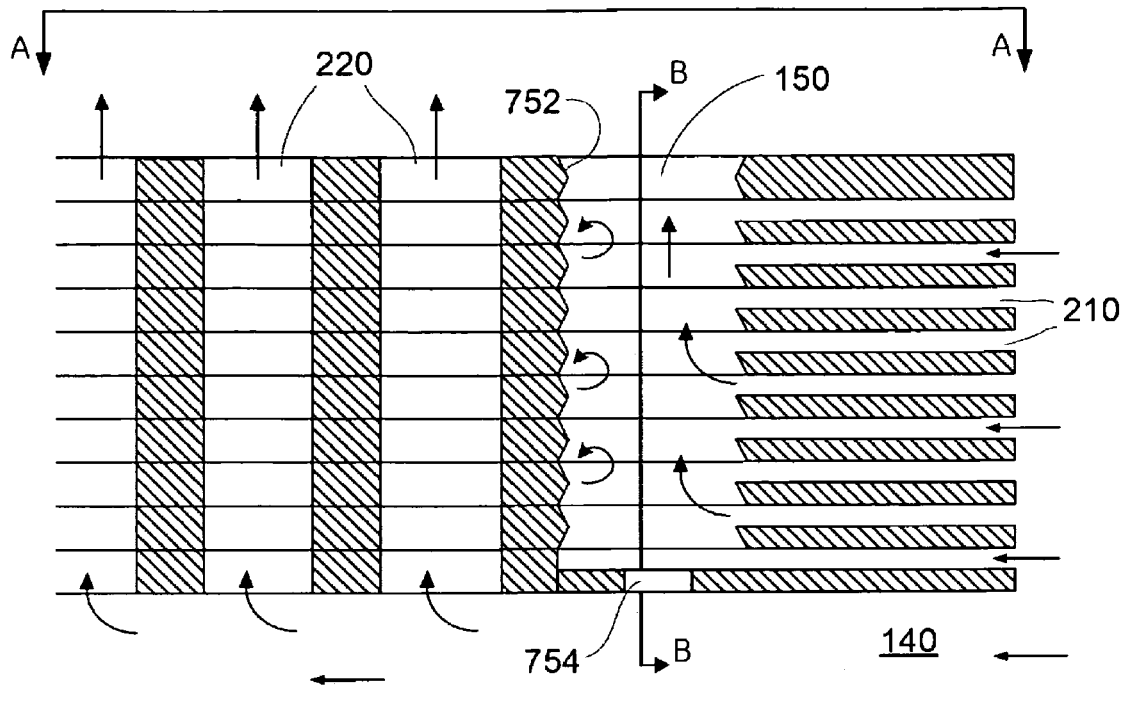
FIG. 7 illustrates a sectional view of a turbulated ventilation chimney according to another embodiment of the present invention.

FIG. 7 illustrates another embodiment of the present invention that improves the heat transfer performance of the ventilation chimney 150. The interior walls of chimney 150 can be roughened, tilted, or provided with projecting features to enhance turbulated flow. In this embodiment the walls can have triangular or V-shaped projections 752, which extend out into the flow of the cooling gas. These projections 752 turbulate the gas flow and create more interactions between the surface area of the chimney 150 and the cooling gas. The result is that the warmer cooling gas in chimney 150 cools the surrounding copper windings more effectively by the increase in heat transfer area and the decrease in thermal boundary layer that results from the augmented turbulence. In additional embodiments of the present invention, the projections 752 could be placed on all or a portion of the chimney 150. In some embodiments, the projections 752 could also be one or combinations of V-shaped, V-shaped with rounded corners, triangular, triangular with rounded corners, trapezoidal, trapezoidal with rounded corners, spherical, quadrilateral, and quadrilateral with rounded corners in cross-section. The projections 752 could also be formed by dimpled, irregular, scalloped, or wavy shapes.

A bleeder hole 754 can also improve the flow velocity and heat transfer in chimney 150. Bleeder hole 754 would introduce cool subslot gas into the bottom of chimney 150, and improve heat transfer performance through higher gas velocity and greater temperature difference between the copper conductors and the cooling gas. The bleeder hole 754 size and/or position can be adjusted based on specific applications and desired flow rates.

Figure 8:
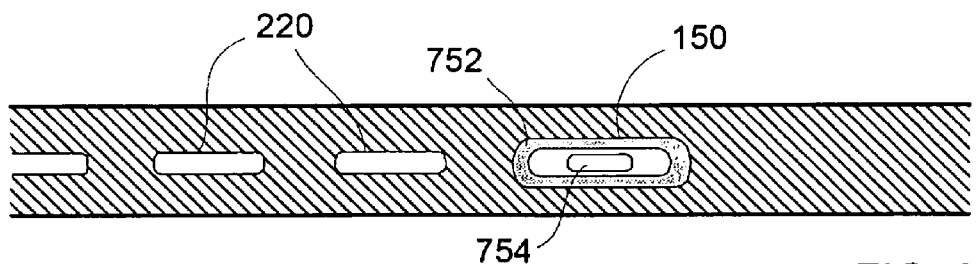
FIG. 8 illustrates a top-down view, along section line A-A of FIG. 7, and shows the relative size of the ventilation chimney compared to the radial ducts.
Figure 9:
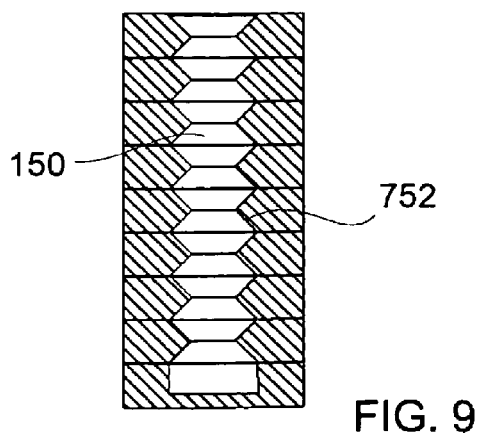
FIG. 9 illustrates a cross section of the termination of the end turn cooling grooves in the ventilation chimney as viewed from section line B-B of FIG. 7.

FIG. 8 illustrates a top view along section line A-A of FIG. 7, and shows the relative size of the chimney 150 compared to the radial ducts 220. FIG. 9 illustrates a view along section line B-B of FIG. 7. It can be seen that the interior walls of chimney 150 have multiple projections that increase the heat transfer area and turbulate the flow of the cooling gas.

Figure 10:
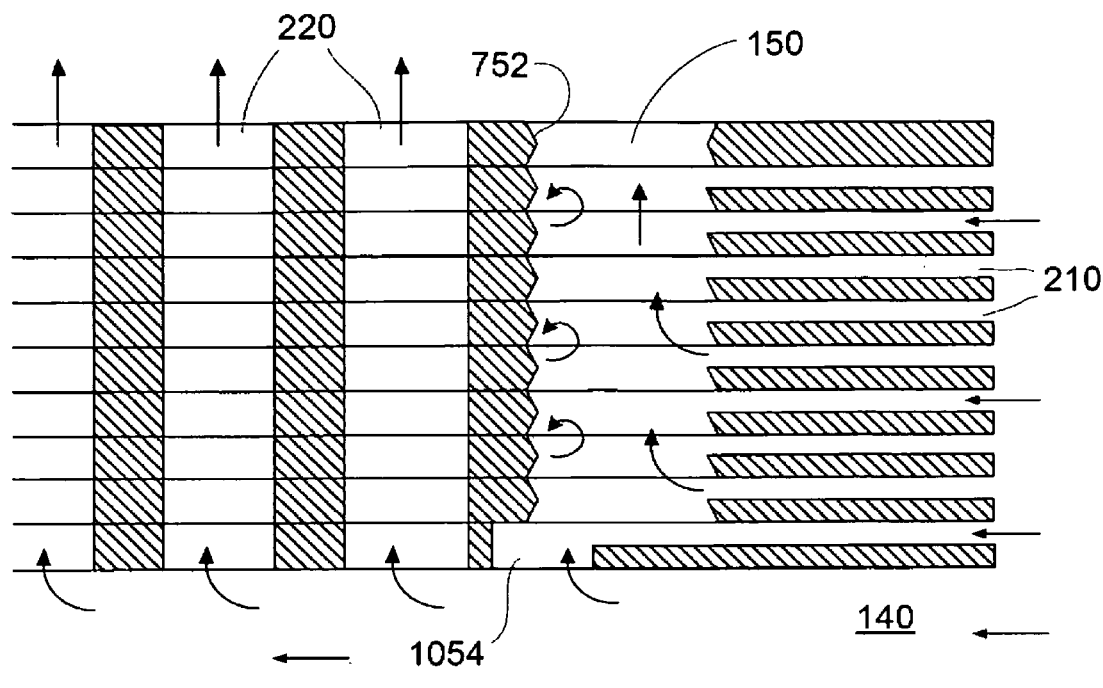
FIG. 10 illustrates a still further embodiment of the present invention incorporating a bleeder hole in the bottom of the chimney.
Figure 11:
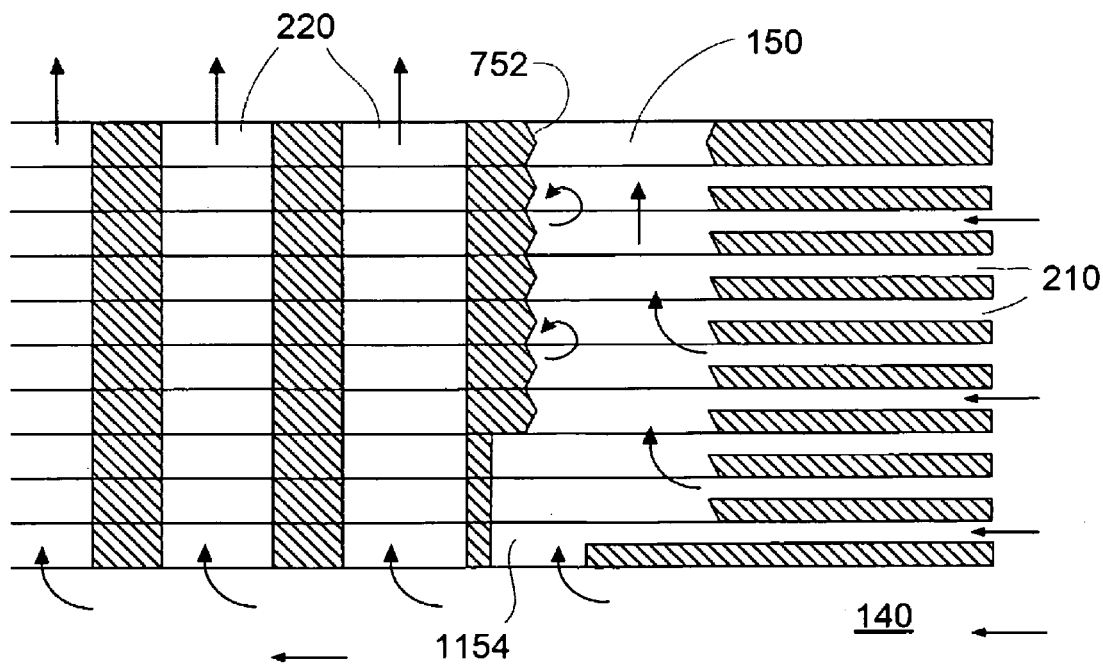
FIG. 11 illustrates another embodiment of the present invention incorporating a bleeder hole extending up through multiple turns in the bottom of the chimney.

FIG. 10 illustrates another embodiment of the present invention where bleeder hole 1054 is offset and extends up and into the first turn. FIG. 11 illustrates an embodiment where bleeder hole 1154 extends up and into the first three turns. In these embodiments the cooling gas is introduced along the wall of the chimney 150 and may be targeted to cool "hot spots" in the winding. The bleeder hole can extend through one or more turns, and the walls of the bleeder hole may be turbulated to increase heat transfer.

Figure 12:
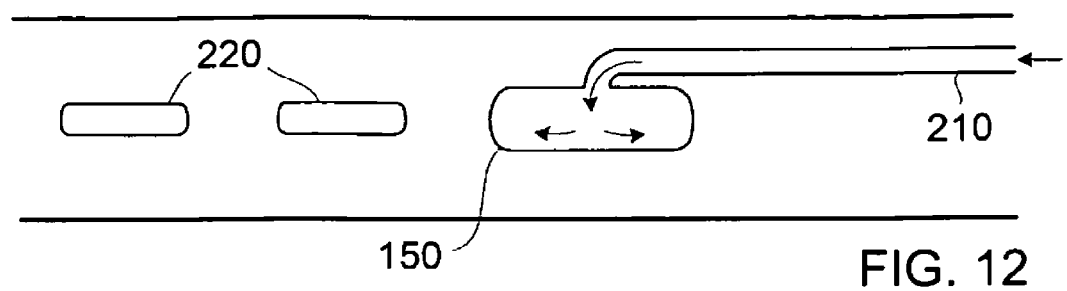
FIG. 12 illustrates a top-down view of a turn, and shows the location where the end turn cooling grooves exhaust into the chimney slot, according to one embodiment of the present invention.
Figure 13:
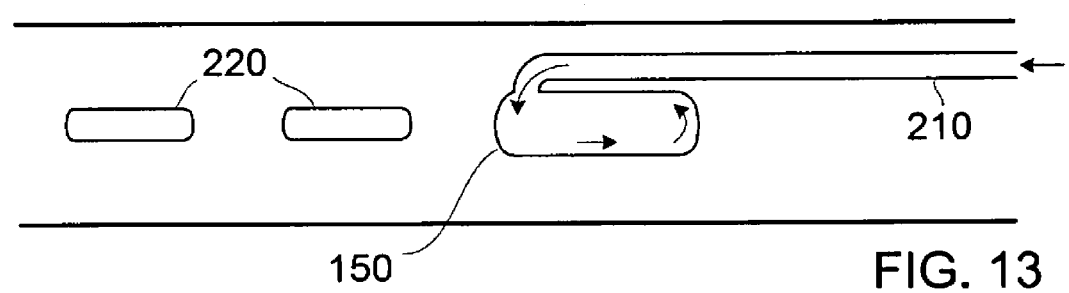
FIG. 13 illustrates a top-down view of a turn, and shows the location where the end turn cooling grooves exhaust into the chimney slot, according to another embodiment of the present invention.
Figure 14:
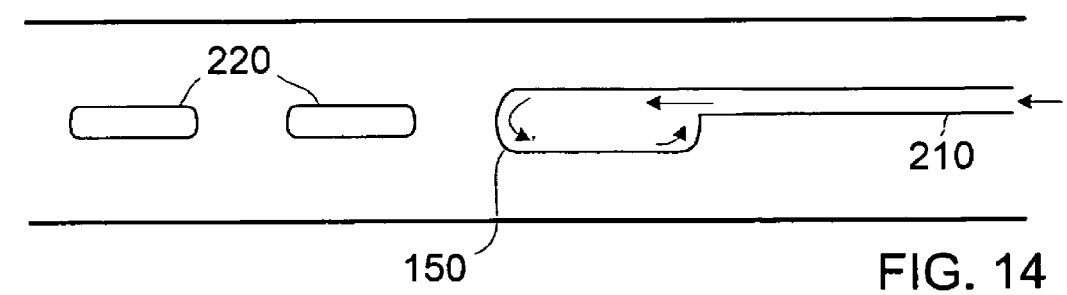
FIG. 14 illustrates a top-down view of a turn, and shows the location where the end turn cooling grooves exhaust into the chimney slot, according to a still further embodiment of the present invention.

FIGS. 12, 13 and 14 illustrate various embodiments of the present invention that can increase the thermal performance of the cooling gas flowing within chimney 150. The configuration shown in FIG. 12 increases turbulence by placing the end turn groove exhaust point such that the end turn flow is forced to work harder in the duct to increase heat transfer. The flow is introduced from the side of the chimney slot or duct to cause impingement on the duct wall and increase heat transfer. The configurations shown in FIGS. 13 and 14 place the end turn groove outlet so that the flow in the chimney is set into a swirling motion, thereby increasing heat transfer on the chimney wall. The end turn groove exhaust point can be placed in various locations along the chimney slot, and the examples shown are but a few of many suitable locations. Some chimney slots may have the end turn groove exhaust point placed at the same location or in a different location with respect to other chimney slots.

Figure 15:
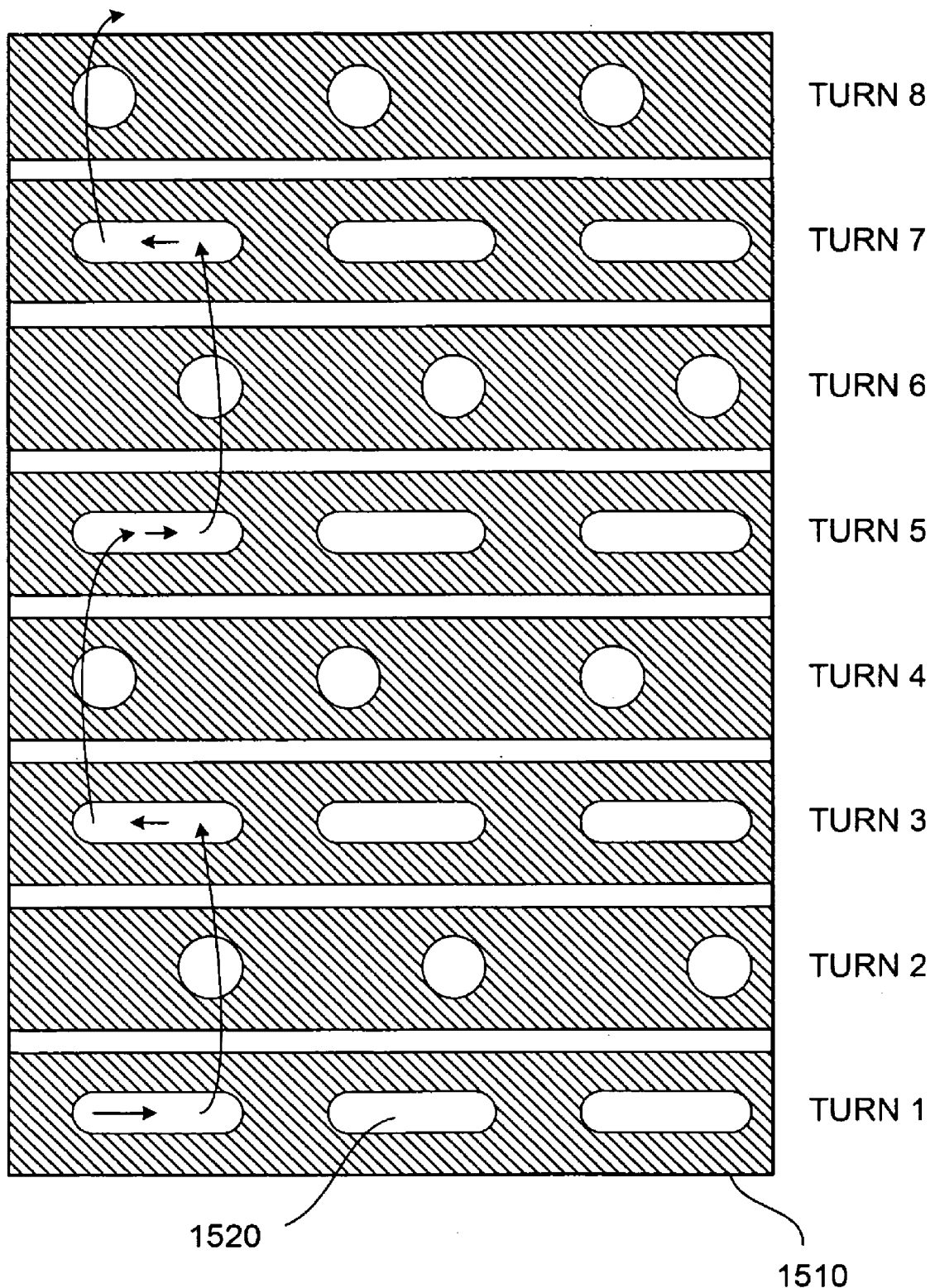
FIG. 15 illustrates a top-down view of each turn, and shows the various locations and different shapes of the chimney slots, according to one embodiment of the present invention.

FIG. 15 illustrates another embodiment of the present invention that can enhance the heat transfer in a chimney 150. In one embodiment the chimney slots 1520 can be arranged in alternating layers with differently shaped holes. In the figure, the individual turns 1510 are arranged side-by-side for clarity purposes, and it is to be understood that in use the turns 1510 would be stacked one upon the other. The even numbered layers (turns) of copper have a row of circular slots (represented as round holes). The odd numbered layers have an offset row of narrow elongated slots. The direction of offset alternates from one odd layer to the next. The cumulative effect of stacking these layers one on top of the other is the formation of an approximately helical flow path (indicated by the arrows in FIG. 15) up the coil stack.

In other embodiments, each turn may have chimney slots or holes of the same or different shapes and/or sizes. For example, one turn may combine oval and circular shaped holes. One or more neighboring turns may have the same or different chimney slot configurations as well. For example, turns 1, 2 and 3 may all have oval shaped holes, and turns 3 and 4 may have circular holes. This is one of many variations that are within the scope of the present invention. In still further embodiments, the circumferential position of one or more chimney slots 1520 may be offset from one another. The variations on size, shape and placement of the chimney slots can enhance the heat transfer of chimney 150.

Aspects of the present invention could also be applied to a radial slot discharge manifold. This manifold may be similar to chimney 150, but can also have one or more axial grooves feeding cooling gas into the chimney from each turn.

Various methods can be used for obtaining a roughened surface for chimney 150. To obtain a chimney having an interior surface having projections the individual copper windings can be milled, coined or punched so that the edges of the chimney are roughened or have specific contours. The inner surface of chimney 150 could also be serrated. The serrations could extend in the radial or vertical direction; however, the serrations could be oriented in the axial or axial-radial direction as well. The serrations could also be formed into a spiral configuration. The serrations can be formed in each turn, or in multiple turns. The serrations could be formed to be generally rectangular, V-shaped or trapezoidal in cross section.

Any of the previously described chimney configurations can be combined with each other or modified to suit the specific application. All of the above embodiments can be used with radial flow and gap pickup methods of cooling the rotor body, and can be used in single, twin or multiple chimney configurations. In some embodiments, alternating sizes or positions were shown, however, multiple sizes (e.g., more than two) and/or multiple positions (e.g., more than two) can be used to obtain increased heat transfer performance. The methods, systems and devices described herein can be used in dynamoelectric machines that are cooled with air, hydrogen gas or any other suitable cooling medium. The ventilation chimneys are typically located at the drive and non-drive ends of the rotor body, and the embodiments herein described could be applied to either or both of the drive and non-drive ends of the rotor body.

While the invention has been described in terms of various specific embodiments, those skilled in the art will recognize that the invention can be practiced with modification within the spirit and scope of the claims.

What is claimed is:

1. A cooling gas ventilation chimney for an end region of a dynamoelectric machine having a rotor, a plurality of radial slots provided in said rotor, and a plurality of coils respectively seated in said plurality of radial slots, a plurality of radially stacked turns comprising a coil, said ventilation chimney comprising:
   one or more chimney slots defined in at least a portion of said radially stacked turns, said one or more chimney slots extending in a substantially radial direction to said rotor, the one or more chimney slots forming an exhaust manifold where an input to the exhaust manifold is a plurality of axially oriented cooling grooves,
   the one or more chimney slots guiding cooling gas substantially in a direction of centrifugal force, and the input to the exhaust manifold guiding cooling gas substantially in a direction orthogonal to centrifugal force,
   wherein at least one or more of said chimney slots are at least one of, graduated in size and gradually changing in size, and configured so that smaller chimney slots are located at inner radial positions and larger chimney slots are located at outer radial positions of the radially stacked turns, and
   wherein at least one or more of said chimney slots having an axial or circumferential length different from another one of said chimney slots, and the exhaust manifold is located in at least one of the slot end region and end winding region of the rotor.

2. The cooling gas ventilation chimney according to claim 1, wherein said chimney slots are turbulated so as to have at least one or combinations of a roughened surface profile, tilted edge, a dimpled and scalloped surface, for enhanced heat transfer.

3. The cooling gas ventilation chimney according to claim 1, wherein said one or more chimney slots comprise one or more projections.

4. A cooling gas ventilation chimney for an end region of a dynamoelectric machine having a rotor, a plurality of radial slots provided in said rotor, and a plurality of coils respectively seated in said plurality of radial slots, said plurality of radially stacked turns comprising a coil, said ventilation chimney comprising:
   one or more chimney slots defined in at least a portion of said radially stacked turns, said one or more chimney slots extending in a substantially radial direction to said rotor, the one or more chimney slots forming an exhaust manifold where an input to the exhaust manifold is a plurality of axially oriented cooling grooves;
   the one or more chimney slots guiding cooling gas substantially in a direction of centrifugal force, and the input to the exhaust manifold guiding cooling gas substantially in a direction orthogonal to centrifugal force;
   at least a portion of a surface of said one or more chimney slots being turbulated so as to have a roughened surface profile for enhanced heat transfer; and
   wherein at least one bleeder hole is located near the bottom of said chimney for admitting cooling gas from a subslot of said rotor.

5. The cooling gas ventilation chimney according to claim 4, wherein said at least one bleeder hole extends up through one or more of said radially stacked turns.

6. A cooling gas ventilation chimney for an end region of a dynamoelectric machine having a rotor, a plurality of radial slots provided in said rotor, and a plurality of coils respectively seated in said plurality of radial slots, a plurality of radially stacked turns comprising a coil, said ventilation chimney comprising:
   one or more chimney slots defined in at least a portion of said radially stacked turns, said one or more chimney slots extending in a substantially radial direction to said rotor, the one or more chimney slots forming an exhaust manifold where an input to the exhaust manifold is a plurality of substantially axially oriented cooling grooves;
   the one or more chimney slots guiding cooling gas substantially in a direction of centrifugal force;
   one or more end turn cooling grooves configured as an input to the exhaust manifold, the one or more end turn cooling grooves guiding cooling gas substantially in a direction orthogonal to centrifugal force;
   wherein a heat transfer characteristic of said chimney can be improved by at least one, or combinations of, varying the location where said chimney slots meet said one or more end turn cooling grooves and varying the size, shape or position of said one or more chimney slots, and the exhaust manifold is located in at least one of the slot end region and end winding region of the rotor.

7. The cooling gas ventilation chimney according to claim 6, wherein said one or more end turn cooling grooves exhaust into said one or more chimney slots at about the middle of said one or more chimney slots.

8. The cooling gas ventilation chimney according to claim 6, wherein said one or more end turn cooling grooves exhaust into said one or more chimney slots at about a circumferentially outward and axial end portion of said one or more chimney slots.

9. The cooling gas ventilation chimney according to claim 6, wherein said one or more end turn cooling grooves exhaust into said one or more chimney slots at about an axial end portion of said one or more chimney slots.

10. The cooling gas ventilation chimney according to claim 6, wherein said one or more chimney slots are comprised of at least a first set of chimney slots having a first shape, and a second set of chimney slots having a second shape;
    wherein said first shape is different from said second shape, and where a cumulative effect of stacking the one or more chimney slots on top of one another is the formation of a generally helical flowpath up the exhaust manifold.

11. The cooling gas ventilation chimney according to claim 10, wherein said first shape is substantially circular and said second shape is substantially oval.

12. The cooling gas ventilation chimney according to claim 10, wherein a first set of said radially stacked turns comprise chimney slots of said first shape, and a second set of said radially stacked turns comprise chimney slots of said second shape.

13. The cooling gas ventilation chimney according to claim 10, wherein even numbered radially stacked turns comprise chimney slots of said first shape, and odd numbered radially stacked turns comprise chimney slots of said second shape.

14. The cooling gas ventilation chimney according to claim 10, wherein at least one of said radially stacked turns comprise chimney slots of said first shape and said second shape.

15. The cooling gas ventilation chimney according to claim 10, wherein said radially stacked turns comprise chimney slots of three or more different shapes.

16. The cooling gas ventilation chimney according to claim 6, wherein a heat transfer characteristic of said chimney can be improved by combining at least two or more of, varying the location where said chimney slots meet said one or more end turn cooling grooves, varying the size of said chimney slots, varying the shape or said chimney slots, varying the position of said chimney slots, and providing a turbulated surface on said ventilation chimney.

* * * * *